INVENTOR
HRISTO V. PAPAYOTI

BY Hauke, Krass, & Gifford
ATTORNEYS

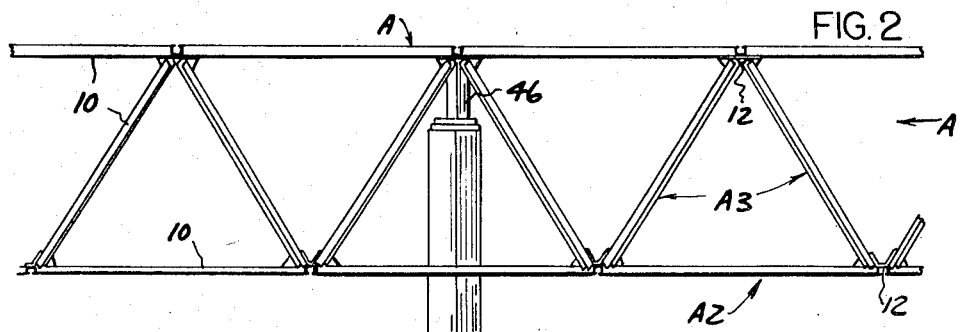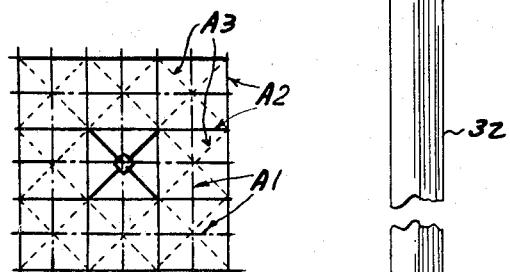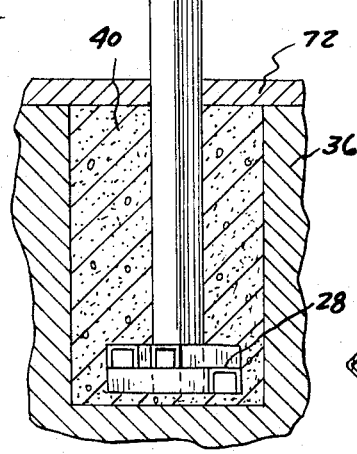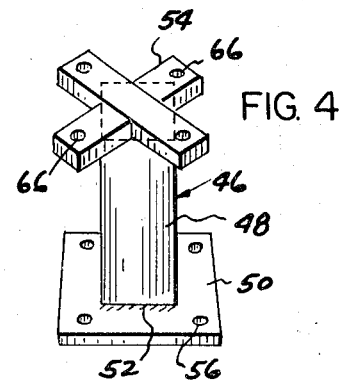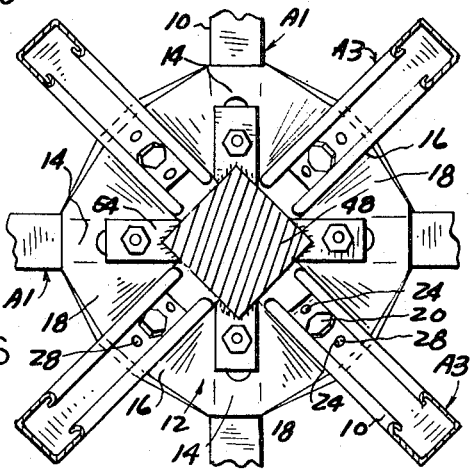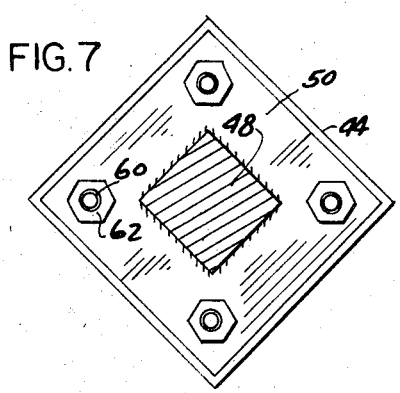

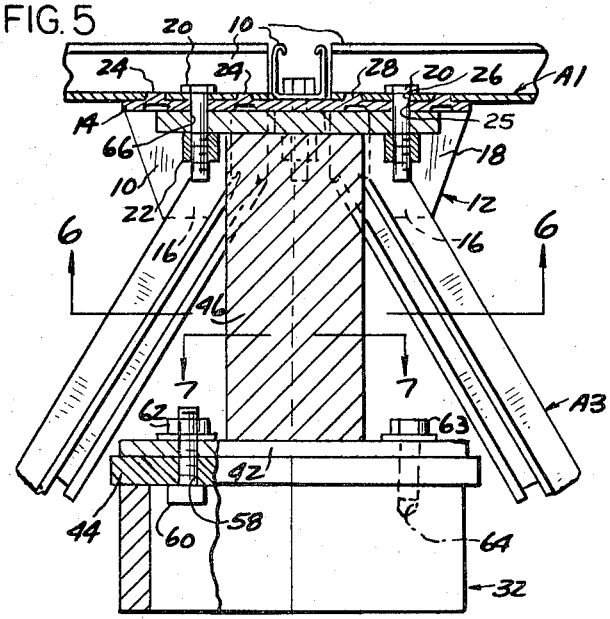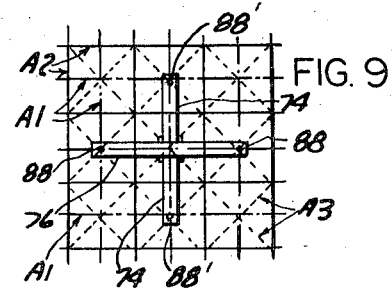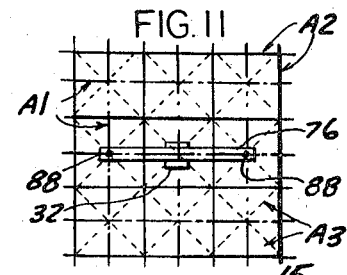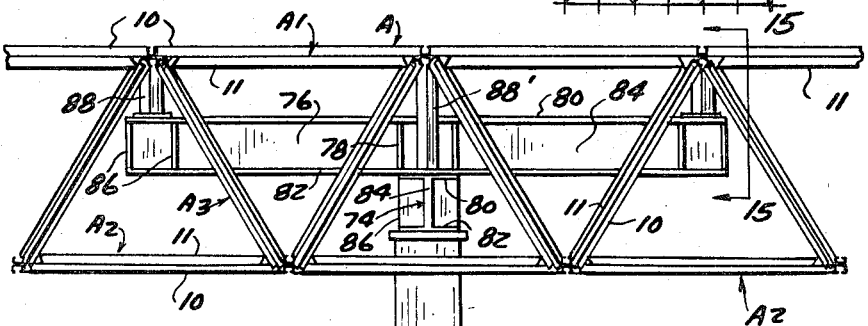

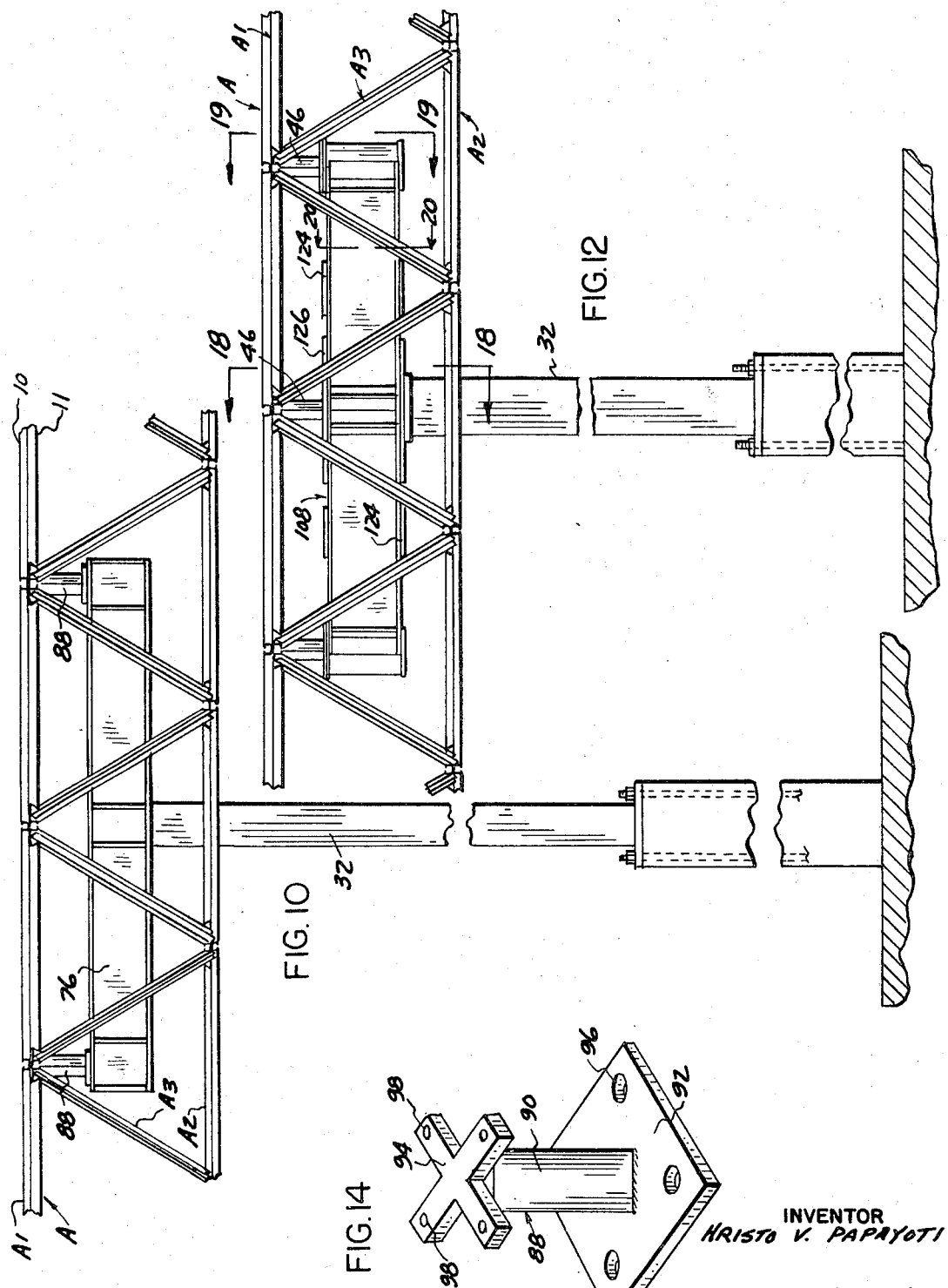

May 13, 1969  H. V. PAPAYOTI  3,443,348
SPACE FRAME SUPPORT STRUCTURES

Filed Oct. 17, 1966

INVENTOR
HRISTO V. PAPAYOTI

BY *Hauke, Kraus, & Gifford*
ATTORNEYS

INVENTOR
HRISTO V. PAPAYOTI

BY Hauke, Krass, & Gifford
ATTORNEYS

United States Patent Office 3,443,348
Patented May 13, 1969

3,443,348
SPACE FRAME SUPPORT STRUCTURES
Hristo V. Papayoti, Ann Arbor, Mich., assignor to
Unistrut Corporation, Wayne, Mich., a corporation
of Michigan
Filed Oct. 17, 1966, Ser. No. 588,277
Int. Cl. E02d 27/42; E04h 12/00
U.S. Cl. 52—299                                14 Claims

ABSTRACT OF THE DISCLOSURE

A support structure for a space frame system of the type wherein an upper chord frame and a lower chord frame structure are formed of a plurality of strut members connected to each other and held together by a plurality of connecting fixtures. The support structure is adapted for connection to the connecting fixtures and includes one or more cross arm members carried by pedestal members supported at the top of support columns.

---

The present invention relates to building construction and more particularly to support structures for space frame constructions and the like providing load carrying structural capacity.

In Patent No. 3,270,478, is disclosed a standardized system of space frame construction involving the use of lightweight, interchangeable elements of high quality, manufactured to close tolerances, that can be assembled at very low cost even by relatively inexperienced workmen to form structures varying greatly in design and capable of being readily disassembled, altered or expanded to meet the changing needs of the owner or user. Such a flexible type of structural framework is well suited for many different types of buildings, pavilions, trusses, structural spans and the like. In addition, such structural framework meets not only requirements of flexibility, standardization and high quality, but it is capable of carrying large loads and can be engineered to form spaces of varying sizes and shapes instead of being limited to certain overall fixed dimensions as is the case with conventional structures.

As disclosed in the above mentioned patent, a "space frame" is a structure in which forces act in three or more directions in space. The structure uses four substantially standardized basic parts, namely, connection fixtures, struts, bolts and nuts. The heart of these four basic parts is a pre-formed universal connecting fixture having accurately located seats with accurate locating and securing means.

The space frame systems as disclosed in the said patent can be applied to roof span construction as well as floor construction and other structures. Until the appearance on the market of such space frame systems of construction, trusses and the like used in structures were either welded together and carried to the construction site, or were assembled by welding, riveting or bolting on the construction site from specified parts which individually were adapted for only one specialized use and had to be altered as necessary as construction progressed.

Shortcomings and inconveniences of previous art construction systems are overcome by the space frame system of construction utilizing lightweight, easily handled modular parts which, since they are manufactured in large quantities, are of such accurate dimensions that interchangeability is a rule rather than the exception. The precision with which parts are made in the factory insures speed and accuracy in assembly. The parts arrive on the site pre-finished and are readily joined together. Workmen do not have to use tapes or squares, and the simplicity of assembly even permits the employment of relatively unskilled labor. The present invention has among its principal objects to provide structural support means for frame structures and the like away from the ground. In building constructions it is common practice to support a floor structure, a roof structure, or a span structure a predetermined distance above the ground, and the present invention provides such support means in a manner particularly well adapted as a support means for space frame structures having appropriate load carrying capacity and characteristics, although the principles of the invention may also be applied to support structures used in combination with structural systems other than the "space frame" construction systems.

Briefly stated, a space frame structure according to the principles disclosed in the aforementioned patent include a lower chord frame structure and an upper chord frame structure parallel to each other and disposed in planes substantially perpendicular to the general direction of the gravitational field of the location on which the structure is erected. A stress distributing web structure spaces and connects the lower and upper chord frame structures, all the channels or other elongated stress carrying members forming the chord structures and the web structures being interconnected by ways of standardized connecting fixtures regularly spaced along a plurality of longitudinal and lateral rows. The present invention provides structural support means adapted to provide multiple-point load carrying capacity for a space frame structure forming a floor or a roof for a building or the like, such multiple-point support structure being standardized, preferably, so as to particularly adapt itself to the mode of construction utilized in the space frame systems. More particularly, each point of attachment of the load carrying support structure to the space frame structure is arranged so as to co-operate and combine with one or more of the connecting fixtures forming part of the upper or lower chord frame structure. In this manner, suspended space frame structures may be erected with considerable load carrying capability while still forming spans of considerable length and width providing unobstructed floor spaces of substantial areas. This is accomplished by providing only a few supporting columns each of which is preferably provided with one or more cross-arm members disposed on the top of the support column, each cross-arm member being in turn adapted to be connected to the space frame structure by means of standardized short pillar members, pedestal mounts, or the like, having connecting means on both ends thereof for attachment respectively to the connecting fixtures of the space frame structure and to the cross-arm members. In this manner, multiple-point support is provided for the space frame structure so as to furnish substantial rigidity and load carrying capacity by way of a limited number of support columns. Preferably, although not necessarily so, the upper chord frame structure rather than the lower chord frame structure is thus supported by the support structure.

The principal object, consequently, of the present invention is to provide support means for a framework structure disposed a predetermined distance from the ground, and, preferably, to provide such support means as particularly adapted to afford a support means for a space frame structure.

Another object of the invention is to provide support means for a space frame structure presenting multiple-point attachment between the support means and the supported structure so as to furnish substantial load carrying capacity without any sacrifice to lightness and architectural elegance.

A further object of the invention is to provide support means for a space frame structure having a limited number of widely spread apart support columns, or the like, such as to supply below the structure substantially large areas devoid of obstructions.

Other objects and advantages of the invention will become apparent when the description thereof is considered in conjunction with the accompanying drawings, illustrating some examples of preferred embodiments of the invention, and wherein like reference numerals refer to like parts throughout the several views, and in which:

FIG. 2 is an elevation view of a portion of the space frame structure supported by the support means of FIG. 1;

FIG. 3 is a diagrammatical schematic plan view showing in projection the chord frame structures and the web frame structure and depicting the manner in which the frame structure is supported by the support means of FIGS. 1–2;

FIG. 4 is a perspective view of an example of support pillar or connector as used in the present invention;

FIG. 5 is an enlarged detailed view of the pillar or pedestal portion of FIGS. 1–3;

FIG. 6 is a view from line 6—6 of FIG. 5;

FIG. 7 is a view from line 7—7 of FIG. 5;

FIG. 8 is an elevation view of another example of embodiment of support means according to the invention;

FIG. 9 is a diagrammatical schematic plan view as seen from the top of FIG. 8;

FIG. 10 is an elevation view of another example of support means according to the invention;

FIG. 11 is a diagrammatical schematic plan view as seen from the top of FIG. 10;

FIG. 12 is an elevation view of still another example of embodiment of support means according to the invention;

FIG. 13 is a diagrammatic schematic plan view as seen from the top of FIG. 12;

FIG. 14 is a perspective view of another connecting member according to the present invention;

Figure 1:
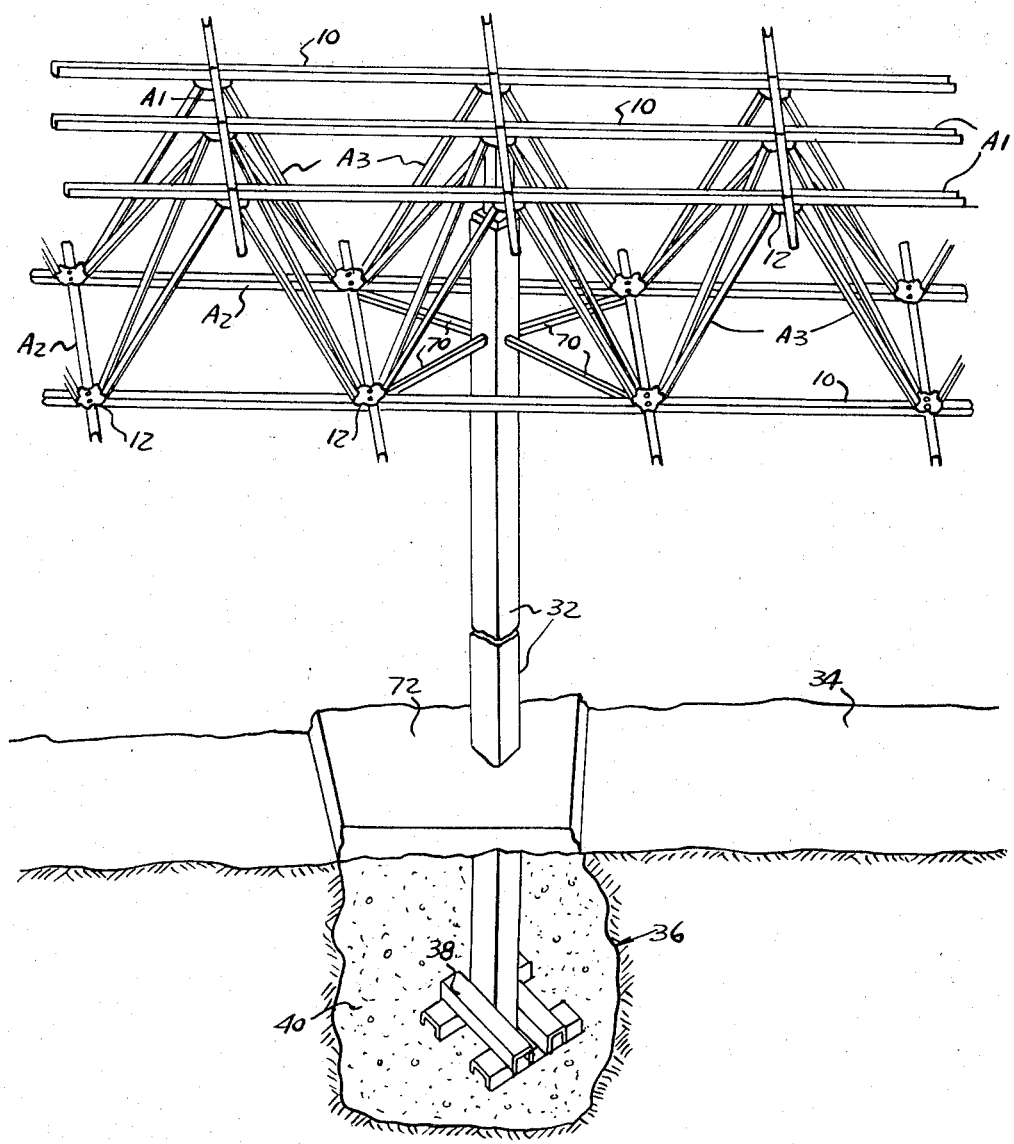
FIG. 1 is a perspective view of a portion of a space frame structure supported by support means according to one aspect of the present invention.

Referring now to the drawings, and more particularly to FIGS. 1–6 thereof, there is shown an example of application of the support structure of the present invention to a framework, preferably to a framework of the space frame system variety. A space frame structure generally designaated at A comprises an upper chord frame structure A1 and a lower chord frame structure A2 held in spatial relationship by way of an intermediate web structure A3. The upper and lower frame structures and the web structures are made of a plurality of strut members 10, which are preferably channel shaped and which are well known in the trade as being marketed under the trade name of "UNISTRUT."

The upper and the lower chord frame structures A1 and A2 also comprise a plurality of connection members or connecting fixtures, as shown at 12. Each connecting fixture, particularly described in detail in the hereinbefore referred to patent and patent application, and as best seen, for example, in FIGS. 5 and 6, consists of a member provided with a horizontal or plane portion having a plurality of regularly spaced coplanar seats 14, and a plurality of equidistant angled seats 16 joined to the coplanar seats 14 by way of inclined integral gussets 18. Means are provided with respect to each seat for fastening the end of the struts thereon. As best seen in FIG. 5, each connecting fixture 12 of the upper chord frame structure A1 has mounted on the top surface of each coplanar seat 14 a strut member 10 by means such as bolt 20 passing through aligned apertures 26 in the strut member and 25 in the connecting fixture seat, and nut 22. Each end of the strut members 10 is preferably provided with a pair of apertures 24, symmetrically disposed on both sides of the aperture 26 adapted to receive the bolt 20, and each aperture 24 is adapted to accept the projecting portion of a coined lug 28 integral with the seat 14, for the purpose of providing perfect alignment and secure fastening of the elements together, as described in detail in the hereinbefore referred to patent. As best seen in FIG. 6, every strut member 10 forming the web frame structure A3 is mounted on an angled seat 16 of the connecting fixtures by way of a similar arrangement comprising a bolt 20, adapted to pass through an appropriate aperture in the channel and cooperating with a nut, not seen, alignment of the strut members relatively to the connecting fixture being provided also by a pair of apertures 24 symmetrically disposed on both sides of the aperture receiving bolt 20 and adapted to receive a projecting portion of a lug 28 coined on the surface of the angled seat 18, also in a manner indicated in detail in the aforesaid patent.

The web struts are preferably attached to the inside surface of the angled seats 16 of the connecting fixtures 12 in the upper chord frame structure A1 and they are preferably attached to the outer surfaces of the angled seat 16 of the connecting fixtures 12 forming part of the lower chord frame structure A2. It is however evident that such an arrangement is a matter of choice and that the whole structure can be assembled so that the upper chord frame becomes the lower chord frame and vice versa.

The space frame structure thus formed has an upper chord frame structure which is in a plane parallel to the plane of the lower chord frame structure, the strut members in each chord frame structure being arranged in squares with the intersections of the squares in one plane being vertically opposite the centers of squares in the other plane, as best shown, for example, in FIG. 2. The intersections of the squares in one plane are joined to those in the other plane by the diagonally arranged web strut members forming the web structure A3 such that the resulting structure consists of a plurality of four sided pyramids set together right side up and upside down with all edges of the same length. In such a space frame arrangement, a single connecting fixture 12 accommodates 8 strut members with each strut member being secured to the appropriate seat of the connecting fixture by a single bolt and nut, as previously explained.

The present invention provides above the ground support for such a framework by one or more support means adapted to hold the frame structure a predetermined distance from the ground in such a manner as to provide proper stress and load conveying from the frame structure to the support means. An example of such a support structure is shown in FIGS. 1–7 wherein, as best seen in FIGS. 1–3, there is provided an upright column member 32 which may be plain or hollow, round, square or rectangular in cross-section and which has a lower end forming a footing with the ground 34 by any appropriate conventional means, such a footing being generally designated at 36 and comprising, as shown, for example crosswise disposed members 38 welded or otherwise attached to the bottom of the upright column 32 and properly anchored in the ground by means of gravel, concrete or the like, as shown at 40. The top of the upright column 32 is provided with a seat end face, best seen in FIG. 5 as shown at 42, which may be the top surface of a plate 44 welded or otherwise fastened to the top of upright column member 32. On the top of surface 42 of plate 44 is mounted a substantially short pedestal or pillar member 46, a perspective view of which is shown in FIG. 4, and which includes a pillar portion 48 having a base 50 on the bottom thereof, being thus preferably welded as shown at 52, and having an X-shaped seat member mounted on the top end thereof as shown at 54, the X-shaped seat member being attached thereto by any appropriate means such as welding. The base 50 is provided with mounting holes 56 adapted to register, as shown in FIG. 5, with appropriate holes 58 in the plate 44 so as to provide adequate mounting of the short pillar member 46 thereon by means such as bolts 60 and nuts 62. If upright column member 32 is plain, base 50 of short pillar member 46 may be fastened thereon by means such as studs 64 and nuts 63, such an alternate construction being shown at the right hand side of FIG. 5.

The X-shaped seat member 54 of the short pillar member 46 is provided with apertures 66 arranged such as to normally register with apertures 25 in the connecting fixture 12 so as to be fastened to the bottom face of the coplanar surfaces 14 of the connecting fixture forming part of the upward chord frame structure A1 by means of the same fastening means, consisting of bolt 20 and nut 22, as used for fastening thereon the upper chord frame strut member 10 to the connecting fixture.

In this manner the top of each upright column 32 is adapted to support the space frame structure A on one point below a connecting fixture, bracing members shown at 70 in FIGS. 1 and 3 being disposed between the proximate connecting fixtures 12 forming part of the lower chord structure A2 and the side surface of the upright column 32 so as to provide for increased rigidity and stability of the supported structure with respect to the support means.

It can thus be seen that the space frame structure A may be supported away from the ground by means such as hereinbefore described so as to provide between the space frame and the ground any appropriate head clearance and so as to provide a ground area which may be provided with a reinforced concrete, or the like, ground floor, as shown at 72 in FIGS. 1 and 2, having substantial unobstructed floor area, the only obstructions being caused by the presence of a plurality of substantially far-apart column members.

FIGS. 8–9 represent a multiple-point support arrangement for a space frame or the like. The upper chord frame structure A1 of the space frame A is supported from the top of an upright column member 32 by means of cross-arm members 74 and 76 mounted substantially at right angles to each other at mid-distance from their respective ends, and disposed such that cross-arm member 74 is mounted directly on the top of the column member 32 and cross-arm member 76 is mounted on the top of cross-arm member 74. The cross-arm members 74 and 76 which are, as shown in the drawing, in the shape of I-beams with top and bottom horizontal parallel portions, as shown at 80 and 82, separated by an integral or welded vertical rib 84 are provided with reinforcing plates shown at 78, welded to the inner surfaces of the parallel portions 80 and 82 and disposed in planes perpendicular to the axes of the beams where they are bolted or otherwise fastened on top of each other and to the top of column member 32. The cross-arm members are also provided with reinforcing plates 86 welded on both ends thereof in the same manner as reinforcing plates 78. On each end of cross-arm member 74 is mounted a pedestal or short pillar member 88 and on each end of cross arm member 76 is mounted a pedestal or short pillar member 88'. Pedestals or short pillar members 88 and 88' are generally of the configuration shown in FIG. 14, and are adapted to support the upper chord frame structure A1 as shown in detail in FIGS. 15–17. The general configuration of pedestals or short pillar members 88 and 88' is substantially the same except that their body sections 90 are of different lengths to accommodate the differences in height positions of the cross-arm members. Each pedestal or short pillar member 88 or 88' is provided with a base plate 92 welded on the bottom end of the body section 90 and with an X-shaped seat member 94 welded on the top end of the body section. Base plate member 92 is provided with mounting apertures 96 adapted to register with mounting apertures 100 in the upper horizontal member 80 of each cross-arm member, a substantially long bolt 102 passing through each mounting aperture 100 and aligned aperture 104 in the lower portion 82 of the cross-arm member, long bolt 102 having on its end a threaded portion adapted to engage the thread of mounting nut 106 for fastening the pedestal or short pillar member in position. The X-shaped seat member 94 is provided on each arm thereof with a mounting aperture 98 adapted to register with the mounting aperture 25 in each coplanar seat 14 of a connecting fixture 12 forming part of the upper cord frame structure A1 so as to receive mounting bolt 20 which, together with nut 22, is adapted to fasten each strut member 10 to each coplanar seat of the connecting fixture.

It is readily apparent, as revealed by a comparison between FIG. 14 and FIG. 4, that the designs of both short pillar members 88 or 88' and 46 are substantially identical, the only difference being mainly in the orientation of the mounting apertures in the base plate member with respect to the mounting apertures in the X-shaped seat member. The mounting apertures 56 in base plate member 50 of short pillar 46 of FIG. 4 are radially oriented with the mounting apertures 66 in X-shaped seat member 54, while the mounting apertures 96 in the base plate member 92 of short pillar member 88 of FIG. 14 are radially disposed forty-five degrees away from the apertures 98 in the X-shaped seat member 94. It is evident that the choice of designs of pedestal or short pillar member, as shown in FIG. 4 or as shown in FIG. 14, is dictated by design considerations in order to facilitate matching of the short pillar member with the parts with which it is assembled.

It is to be noted that although the invention has heretofore been described with respect to applications whereby the upper chord frame structure A, is supported, it is evident that the support structure may be attached, where so required or convenient, to the lower chord frame structure A2, as will be explained hereinafter in further details.

It is also to be noted that the space frame structure shown in FIGS. 1–6 is an example of standard or non-reinforced structure, while the space frame structure shown in FIGS. 8–19 belongs to the reinforced type of structure, where each strut member 10 forming either one of the chord structures or the web structure is provided with a U-channel reinforcing strut 11 disposed back to back therewith. As shown more clearly in FIGS. 15 and 16, the reinforcing strut 11 is mounted parallel to the strut member 10 on the opposite side of the same seat of the connecting fixture 12, by way of the same fastening means. Such a reinforced construction is explained in detail also in the aforesaid patent.

Figure 15:
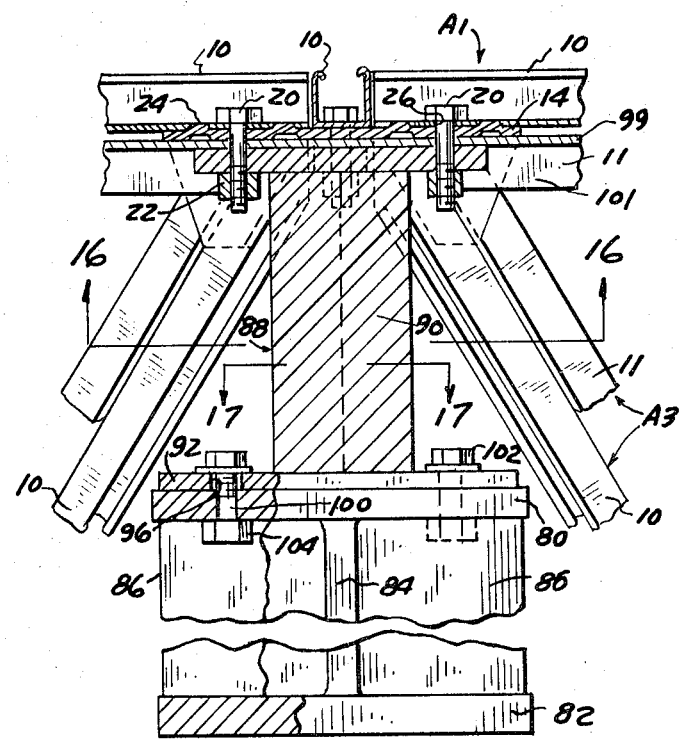
FIG. 15 is an enlarged detail view of the pedestal or pillar portion of FIG. 8, as seen from line 15—15 thereof.
Figure 16:
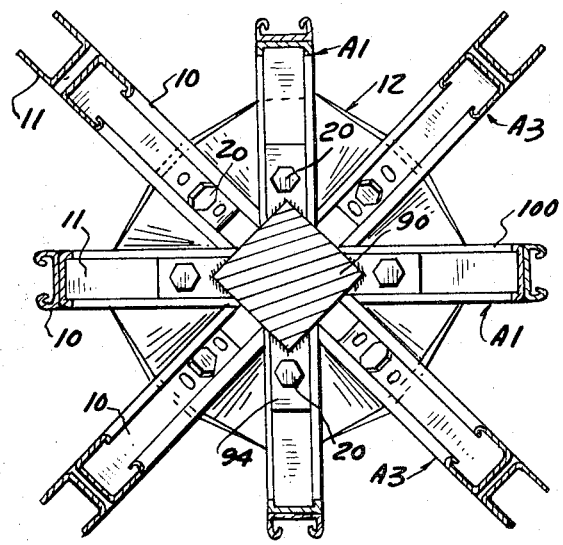
FIG. 16 is a view of the arrangement of FIG. 15 as seen from line 16—16 thereof.
Figure 17:
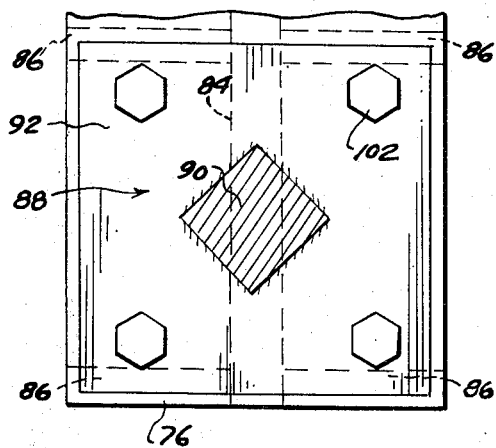
FIG. 17 is a view of the arrangement of FIG. 15 as seen from line 17—17 thereof.

In use with such reinforced construction, each short pillar support member 88 or 88' is mounted between the frame structure support means, represented in FIGS. 8, 15 and 17 by the end of wide flange I-beam 76 or 74 provided with welded-on reinforcing plates 86 and the bottom wall 99 of the reinforcing strut 11, the X-shaped seat member 94 having arms disposed substantially at right angle and narrow enough for engaging the bottom wall 99 of the channel strut members 11 between sidewalls 101 such that the same bolts and nuts 20 and 22 can be used for fastening together upper strut member 10, each of connecting fixture coplanar seats 14, lower reinforcing strut member 11 and X-shaped seat member 94, as a result of the mounting apertures of all the parts being, by design, capable of accurate registration.

As diagrammatically shown in FIG. 9, the support structure arrangement of FIG. 8 provides for a four-point support of the upper chord frame structure A1 or, alternately, suspension of the lower chord frame structure A2 of the space frame by way of cross-arm members 74 and 76 disposed at substantially right angle and mounted at mid-distance from their respective ends on top of each other and upon the top of the column member 32, each of the cross-arm members being provided on both ends thereof with short pillar support member 88 and 88' respectively.

It is evident that by using longer cross-arm members a plural-point supporting arrangement for a space frame can be provided, and also, if it is so desired a fifth short pillar support may be mounted on the top of cross arm member 76 substantially in alignment with the column member 32 so as to provide a fifth support point in the center of the square defined by the four ends of the cross-arm members.

If only one cross-arm member is used, the resulting supporting arrangement is as illustrated in FIGS. 10 and 11, wherein only one cross-arm member 76 is disposed directly mounted at mid-distance from both its ends on top of an upright column member 32, and is adapted to support the upper chord frame structure A1 of the frame structure A by way of two pedals or short pillar members 88, each disposed on one end of the cross-arm member 76.

Figure 18:
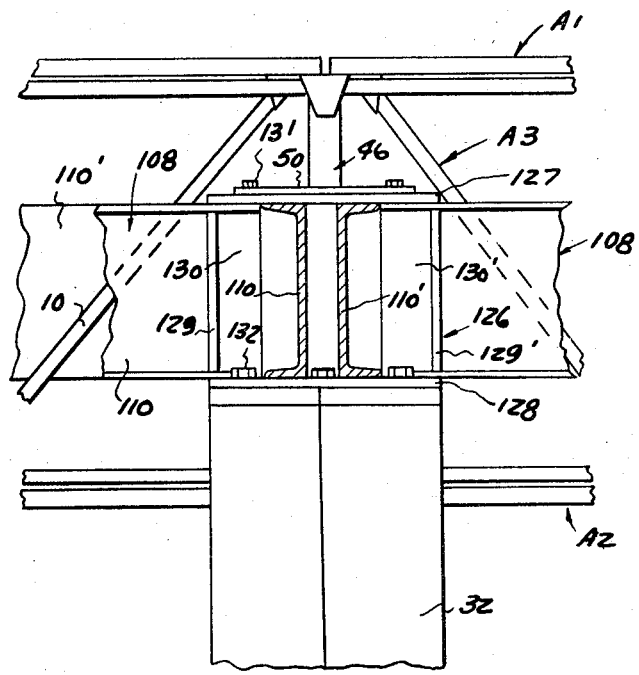
FIG. 18 is a view of the embodiment of FIG. 12 as seen from line 18—18 thereof.
Figure 19:
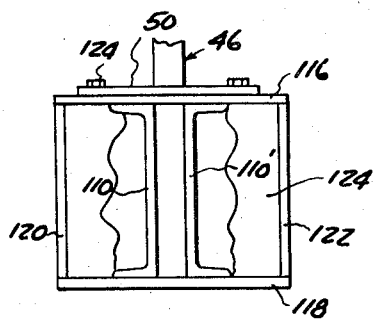
FIG. 19 is another view of the embodiment of FIG. 12 as seen from line 19—19 thereof.

FIGS. 12–13 illustrate another modification of a framework supporting means according to the present invention, wherein an X-shaped cross-arm arrangement, designated at 108, is mounted on the top of an upright column 32 and is provided on each arm end with a pedestal or short pillar support member 88 adapted to support the upper chord frame structure A1, in the same manner as hereinbefore explained in detail. As illustrated more clearly in FIGS. 18–20, the X-shaped cross-arm assembly 108 is preferably made of C-shaped channel beams, spaced apart and symmetrically disposed in parallel pairs as shown at 110 and 110' which, as shown in detail in FIG. 18, are connected together at their ends by way of a welded-on box-like reinforcing member comprising upper and lower plates 116 and 118, vertical side plates 120 and 122 and end plate 124 (FIG. 19). The base 50 of a pedestal or short pillar support member 46 is mounted upon upper plate 116 and fastened thereon by bolts 124.

Figure 20:
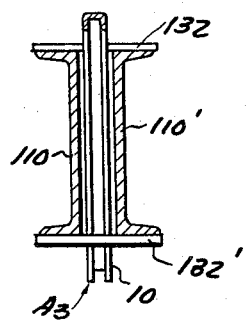
FIG. 20 is a further view of the embodiment of FIG. 12 as seen from line 20—20 thereof.

At the center or X-shaped cross-arm assembly, the four pairs of C-shaped beams 110–110' are welded in assembly by means of a box-like weldment 126 (FIG. 18) comprising upper and lower plates 127 and 128 and vertical gusset plates 129–129' and 130–130'. On the top of upper plate 127 is mounted a short pillar support member 46 having its base plate 50 bolted thereon by way of bolts 131, and the lower plate 128 is mounted upon the top of pillar 32 by way of bolts 132. As shown in FIGS. 12 and 20, intermediate between the ends of each pair of C-shaped beams 110–110', beams are joined by means of gusset plates 132 and 132' to insure more rigidity to the assembly. The space between the C-shaped beams 110–110' of a pair affords a passage for the struts 10 forming the web structure A3, as the axes of the arm portions of the X-shaped cross-arm assembly is substantially aligned with the vertical planes defined by part of the web structure A3 interconnecting the upper and lower chord frame structures A1 and A2.

Figure 21:
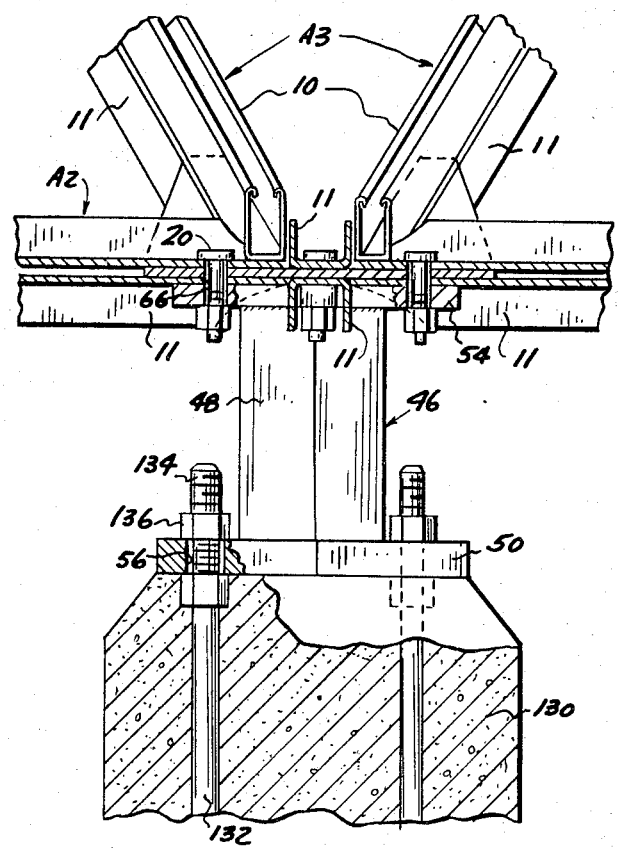
FIG. 21 is a view substantially similar to FIG. 15, but showing a pillar connector or pedestal arrangement according to the invention, used for supporting a lower chord frame structure.

FIG. 21 represents an example of an arrangement whereby the lower chord frame structure A2 is supported a predetermined distance away from the ground by means such as pedestal or short pillar member 46 of FIGS. 4 and 7. The lower chord frame structure as herein illustrated consists of a reinforced structure comprising parallel back-to-back disposed U-channel strut members 10 and 11, bolted on either side of each one of the coplanar seat 14 of connecting fixture 12 by means of bolts 20 and nuts 22, each bolt 22 passing also through one aperture 66 of the X-shaped seat member 54 of short pillar member 46. The web frame structure A3 is formed of back-to-back U-shaped channel strut members 10 and 11, strut 10 being disposed on the top of the angled seat 16 of the connecting fixture 12, while strut 11 is disposed below the said seat.

The base 50 of the short pillar member 46 is bolted upon a footing 130 by means of studs 132 engaged therein and each having a threaded portion 134 adapted to pass through aperture 56 in base plate 50 to engage the threads of nut 136. It is evident that footing 130 may be a short column so as to support the lower chord frame structure A2 a substantial distance from the ground, or, in the alternative, footing 130 may be encased in the ground so as to support lower chord frame structure A2 substantially close to the ground, in which case the space frame structure acts generally as a floor for a building structure.

It is obvious that as many column structures and support structures may be arranged for providing support means for a space frame structure or a framework as may be required by the load carried by such space frame structure or framework. It is also evident that superimposed space frames or frameworks may be supported in parallel vertical relationship to each other by means of a plurality of column members of different heights disposed in such a manner as to provide as many points of support for the superimposed space frames or frameworks as may be required for proper stress and load carrying characteristics, such arrangements being evident to those skilled in the art from the present disclosure.

It is also obvious that the support structures of the invention may be used for supporting the lower chord frame of a "space frame" structure as well as the upper chord frame portion and that arrangements may be designed wherein portions of a space frame assembly are supported at the lower chord while other portions are supported at the upper chord.

I claim:

1. In combination with a load carrying framework comprising a plurality of elongated stress carrying members interconnected by means of stress distributing fixture elements to define an upper chord frame structure and a lower chord frame structure, said fixture element having coplanar surfaces, fastening means for connecting said fixture element with said stress carrying members, and support means for supporting said framework above the ground comprising: at least one upright support member; a lower end on said support member adapted to engage the ground; and means dependent from the upper end of said support member engaging at least one of said fixture elements for fastening therewith, said means comprising a substantially short pillar member having a base mounted on a top of the end of said upright support member and a connecting portion being shaped with equal length arms each adapted to engage one of said fixture element coplanar surfaces, each of said arms having means adapted to cooperate with said fastening means for conjoint mounting therewith, four brace members radially disposed in the plane of said lower chord frame structure, each of said brace members having an end affixed to one of said fixture elements proximate said upright support member and another end laterally abutting said upright support member and attached thereto.

2. In combination with a load carrying framework comprising a plurality of elongated stress carrying members interconnected by means of stress distributing fixture elements to define an upper chord frame structure and a lower chord frame structure, said fixture elements having coplanar surfaces, fastening means for connecting said stress carrying members with said fixture elements, support means for supporting said framework above the ground comprising: at least one upright support member, a lower end on said support member adapted to engage the ground, and means dependent from the upper end of said support member engaging at least one of said connecting members for fastening therewith, said means comprising a cross arm member attached substantially at mid-distance between its ends to the top of said upright support member and a pair of short pillar members each having a base mounted on the top of said cross arm member at one end thereof and a connecting portion at the top of said pillar member, said connecting portion being shaped with equal length arms each adapting to engage each of said coplanar surfaces of one of said fixture elements in said upper chord frame structure, each of said arms having means adapted to cooperate with said fastening means for conjoint mounting therewith.

3. In combination with a space frame structure comprising a lower chord frame structure, an upper chord frame structure, and a web structure spacing and connecting said chord frame structures, each of said chord frame structures comprising a plurality of connector elements, said web structure comprising elongated members extending between the connector elements of one chord frame structure and the connector elements of the other chord frame structure, a support structure for supporting said space frame structure above the ground comprising, at least one upright column, a footing for said column for engagement with said ground, an upper end on said column disposed proximate one of said chord frame structures, and means disposed between and attached to said upper end at at least one of said connector elements, said means comprising a connector member mounted on the top of said upright column for connecting said upright column with one of said connector elements, at least one cross arm member attached to the top of said upright column and at least a pair of connecting members supported by each of said cross arm members at predetermined positions along the length thereof, each of said connecting members being adapted for attachment to one of said connector elements in said upper chord frame structure.

4. In combination with a space frame structure comprising a lower chord frame structure, an upper chord frame structure, and a web structure spacing and connecting said chord frame structures, each of said chord frame structures comprising a plurality of connector elements, said web structure comprising elongated members extending between the connector elements of one chord frame structure and the connector elements of the other chord frame structure, a support structure for supporting said space frame structure above the ground comprising at least one upright column, a footing on said column for engagement with said ground, an upper end on said column disposed proximate said upper chord frame structure, and means disposed between and attached to said upper end and at least one of said connector elements of said upper chord frame structure.

5. In combination with a space frame structure comprising a lower chord frame structure, an upper chord frame structure, and a stress distributing web structure spacing and connecting said chord frame structures, each of said chord frame structures comprising a plurality of fixture elements spaced along a plurality of longitudinal and lateral rows, and elongated stress carrying channels extending between said fixture elements to form longitudinal and lateral rows of adjacent two-dimensional space modules, the modules of one chord frame structure being longitudinally and laterally offset from the modules of the other chord frame structure, said web structure comprising elongated stress carrying channels extending between the fixture elements of one chord frame structure and the fixture elements of the other chord frame structure, said channels of both chord frame structures and of the web structure being of equal length and attached to the fixture elements by appropriate fastening means whereby all space modules are similar and all channels are replaceable and interchangeable and each of said fixture elements comprising four regularly disposed equidistant angled flat surfaces extending radially from a centralpoint for mounting thereon of the ends of the channel forming said web structure, four equidistant coplanar flat surfaces alternating with said angled surfaces and being equidistant therewith for mounting thereon of the ends of the channels forming the chord structures, said surfaces being connected by inclined webs, a support structure for supporting said space frame structure above the ground comprising: at least one upright column; a lower end of said column forming a footing with said ground; an upper end of said column disposed proximate one of said chord frame structures; and means disposed between and attached to said upper end and the coplanar flat surfaces of at least one of said fixture elements in one of said chord frame structures, a substantially short pillar member having a base mounted on the top of the end of said upright column and a connecting portion at the top of said pillar member, said connecting portion being X-shaped with right angled equal length arms each adapted to engage one of said fixture elements coplanar surfaces, each of said arms having an aperture for conjoint mounting by way of said appropriate fastening means.

6. In combination with a space frame structure comprising a lower chord frame structure, an upper chord frame structure, and a stress distributing web structure spacing and connecting said chord frame structures, each of said chord frame srtuctures comprising a plurality of fixture elements spaced along a plurality of longitudinal and lateral rows, and elongated stress carrying channels extending between said fixture elements to form longitudinal and lateral rows of adjacent two-dimensional space modules, the modules of one chord frame structure being longitudinally and laterally offset from the modules of the other chord frame structure, said web structure comprising elongated stress carrying channels extending between the fixture elements of one chord frame structure and the fixture elements of the other chord frame structure, said channels of both chord frame structures and of the web structure being of equal length and attached to the fixture elements by appropriate fastening means whereby all space modules are similar and all channels are replaceable and interchangeable and each of said fixture elements comprising four regularly disposed equidistant angled flat surfaces extending radially from a central point for mounting thereon of the ends of the channel forming said web structure, four equidistant coplanar flat surfaces alternating with said angled surfaces and being equidistant therewith for mounting thereon of the ends of the channels forming the chord structures, said surfaces being connected by inclined webs, a support structure for supporting said space frame structure above the ground comprising: at least one upright column; a lower end of said column forming a footing with said ground; an upper end of said column disposed proximate one of said chord frame structures; and means disposed between and attached to said upper end and the coplanar flat surfaces of at least one of said fixture elements in one of said chord frame structures, said means comprising an X-shaped cross arm member including four coplanar radiating arm members mounted at their interconnected ends on the top of said upright column, a short pillar member mounted on the other end of each of said arm members, said short pillar member having a base mounted on the top of said arm member and a connecting portion on the top of said pillar member, said connecting portion being X-shaped with right angled equal length arms each adapted to engage each of said coplanar surfaces of one of said fixture elements in said chord frame structure, each of said arms having an aperture for conjoint mounting by way of said fastening means.

7. In combination with a space frame structure comprising a lower chord frame structure, an upper chord frame structure, and a stress distributing web structure spacing and connecting said chord frame structure, each of said chord frame structures comprising a plurality of fixture elements spaced along a plurality of longitudinal and lateral rows, and elongated stress carrying channels extending between said fixture elements to form longitudinal and lateral rows of adjacent two-dimensional space modules, the modules of one chord frame structure being longitudinally and laterally offset from the modules of the other chord frame structure, said web structure comprising elongated stress carrying channels extending between the fixture elements of one chord frame structure and the fixture elements of the other chord frame structure, said channels of both chord frame structures and of the web structure being of equal length and attached to the fixture elements by appropriate fastening means whereby all space modules are similar and all channels are replaceable nad interchangeable and each of said fixture elements comprising four regularly disposed equidistant angled flat surfaces extending radially from a central point for mounting thereon of the ends of the channel forming said web structure, four equidistant coplanar flat surfaces alternating with said angled surfaces and being equidistant therewith for mounting thereon of the ends of the channels forming the chord structures, said surfaces being connected by inclined webs, a support structure for supporting said space frame structure above the ground comprising: at least one upright column; a lower end of said column forming a footing with said ground; an upper end of said column disposed proximate one of said chord frame structures; and means disposed between and attached to said upper end and the coplanar flat surfaces of at least one of said fixture elements in one of said chord frame structures, said means comprising a cross arm member attached substantially at mid-distance between its ends to the top of said upright column, and a pair of short pillar members each having a base mounted on the top of said cross arm member at one end thereof and a connecting portion at the top of said pillar member, said connecting portion being X-shaped with right angled equal length arms each adapted to engage each of said coplanar surfaces of one of said fixture elements in said upper chord frame structure, each of said arms having an aperture for conjoint mounting by way of said fastening means.

8. In combination with a space frame structure comprising a lower chord frame structure, an upper chord frame structure, and a stress distributing web structure spacing and connecting said chord frame structure, each of said chord frame structures comprising a plurality of fixture elements spaced along a plurality of longitudinal and lateral rows, and elongated stress carrying channels extending between said fixture elements to form longitudinal and lateral rows of adjacent two-dimensional space modules, the modules of one chord frame structure being longitudinally and laterally offset from the modules of the other chord frame structure, said web structure comprising elongated stress carrying channels extending between the fixture elements of one chord frame structure and the fixture elements of the other chord frame structure, said channels of both chord frame structures and of the web structure being of equal length and attached to the fixture elements by appropriate fastening means whereby all space modules are similar and all channels are replaceable and interchangeable and each of said fixture elements comprising four regularly disposed equidistant angled flat surfaces extending radially from a central point for mounting thereon of the ends of the channel forming said web structure, four equidistant coplanar flat surfaces alternating with said angled surfaces and being equidistant therewith for mounting thereon of the ends of the channels forming the chord structures, said surfaces being connected by inclined webs, a support structure for supporting said space frame structure above the ground comprising: at least one upright column; a lower end of said column forming a footing with said ground; an upper end of said column disposed proximate one of said chord frame structures; and means disposed between and attached to said upper end and the coplanar flat surfaces of at least one of said fixture elements in one of said chord frame structures, said means further comprising four channel base members radially disposed in the plane of said lower chord frame structure, each of said channel base members having an end affixed to one of said fixture elements proximate said upright column and another end laterally abutting said upright column and attached thereto.

9. In combination with a space frame structure comprising a lower chord frame structure, an upper chord frame structure, and a stress distributing web structure spacing and connecting said chord frame structures, each of said chord frame structures comprising a plurality of fixture elements spaced along a plurality of longitudinal and lateral rows, and elongated members extending between said fixture elements to form longitudinal and lateral rows of adjacent two-dimensional space modules, the modules of one chord frame structure being longitudinally and laterally offset from the modules of the other chord frame structure, said web structure comprising elongated members extending between the fixture elements of one chord frame structure and the fixture elements of the other chord frame structure, said elongated members of both chord frame structures and of the web structure being attached to the fixture elements by appropriate fastening means, wherein each of said fixture elements comprises angled flat surfaces for mounting thereon of the ends of the members forming said web structure, and coplanar flat surfaces for mounting thereon of the ends of the members forming chord structures, a support structure for supporting said space frame structure above the ground comprising: at least one upright column; a lower end on said column projecting from said ground; an upper end of said column disposed proximate one of said chord frame structures; a means disposed between and attached to said upper end and the coplanar flat surfaces of at least one of said fixture elements in one of said chord frame structures, radially disposed brace members each having an end affixed to one of said fixture elements and another end attached to said upright column.

10. In combination with a space frame structure comprising a lower chord frame structure, an upper chord frame structure, and a stress distributing web structure spacing and connecting said chord frame structures, each of said chord frame structures comprising a plurality of fixture elements spaced along a plurality of longitudinal and lateral rows, and elongated members extending between said fixture elements to form longitudinal and lateral rows of adjacent two-dimensional space modules, the modules of one chord frame structure being longitudinally and laterally offset from the modules of the other chord frame structure, said web structure comprising elongated members extending between the fixture elements of one chord frame structure and the fixture elements of the other chord frame structure, said elongated members of both chord frame structures and of the web structure being attached to the fixture elements by appropriate fastening means, wherein each of said fixture elements comprises angled flat surfaces for mounting thereon of the ends of the members forming said web structure, and coplanar flat surfaces for mounting thereon of the ends of the members forming chord structures, a support structure for supporting said space frame structure above the ground comprising: at least one upright column; a lower end on said column projecting from said ground; an upper end on said column disposed proximate one of said chord frame structures; a means disposed between and attached to said upper end and the coplanar flat surfaces of at least one of said fixture elements in one of said chord frame structures, said means comprising a cross arm member attached intermediate between its ends to the top of said upright column and a pair of short connecting members each connecting an end of said cross arm member to one of said fixture elements in said upper chord frame structure.

11. The support structure of claim 7 further comprising a second cross-arm member disposed above said first mentioned cross-arm substantially at right angle therewith and a second pair of short pillar members each having a base mounted on the top of said second cross-arm member on one end thereof and a connecting portion at the top of said pillar member, said connecting portion being X-shaped with right angled equal length arms each adapted to engage each of said coplanar surfaces of one of said fixture elements in said upper chord frame structure, each of said arms having an aperture for conjoint mounting by way of said appropriate fastening means.

12. The support structure of claim 6 wherein the upper chord frame structure is supported, said arm members are in vertical alignment with said web structure and each of said arm members is formed by a pair of substantially C-shaped channel beams disposed back to back at a predetermined distance from each other for affording passage to the web structure members extending therebetween.

13. The support structure of claim 2 further comprising a second cross-arm member disposed above said first mentioned cross-arm member substantially at right angle therewith and a second pair of short pillar members each having a base mounted on the top of said second cross-arm member on one end thereof and a connecting portion at the top of said pillar member, said connecting portion being shaped with equal length arms each adapted to engage each of said coplanar surfaces of one of said fixture elements in said upper chord frame structure, each of said arms having means adapted to cooperate with said appropriate fastening means for conjoint mounting therewith.

14. The support structure of claim 7 further comprising a second cross-arm member disposed substantially at right angle with said first mentioned cross-arm member and a second pair of connecting members each connecting one end of said second cross-arm member to one of said fixture elements in said upper chord frame structure.

References Cited

UNITED STATES PATENTS

| | | | |
|---|---|---|---|
| 1,652,415 | 12/1927 | Schenker | 52—169 X |
| 3,103,025 | 9/1963 | Gassner et al. | 52—299 X |
| 3,270,478 | 9/1966 | Attwood | 52—648 |

FRANK L. ABBOTT, *Primary Examiner.*

PRICE C. FAW, JR., *Assistant Examiner.*

U.S. Cl. X.R.

52—648

UNITED STATES PATENT OFFICE
CERTIFICATE OF CORRECTION

Patent No. 3,443,348  Dated May 13, 1969

Inventor(s) Hristo V. Papayoti

It is certified that error appears in the above-identified patent and that said Letters Patent are hereby corrected as shown below:

IN THE SPECIFICATIONS:

Column 4, line 31, "18" should be --16--.

Column 4, line 48, "2" should be --3--.

Column 5, line 71, "88" should be --88'--.

Column 5, line 73, "88'" should be --88--.

Column 6, line 14, "100" should be --96--, "104" should be --100--, "lower" should be --upper--.

Column 6, line 15 "82" should be --80--.

Column 6, line 17, "106" should be --104--.

Column 6, line 46, "A" should be --$A_1$--.

Column 7, line 9, "angle" should be --angles--.

Column 7, line 13 "88" should be --88'-- and "88'" should be --88--.

Column 7, line 49, "124" should be --131--.

PO-1050
(5/69)

UNITED STATES PATENT OFFICE
CERTIFICATE OF CORRECTION

Patent No. __3,443,348__      Dated __May 13, 1969__

Inventor(s)      Hristo V. Papayoti

It is certified that error appears in the above-identified patent and that said Letters Patent are hereby corrected as shown below:

IN THE CLAIMS:

Claim 7, column 11 line 18, "nad" should be --and--.

IN THE DRAWINGS:

Figure 19- Change "124" upper portion to --131--.

SIGNED AND
SEALED

JUN 16 1970

(SEAL)
Attest:

Edward M. Fletcher, Jr.
Attesting Officer

WILLIAM E. SCHUYLER, JR.
Commissioner of Patents